Dec. 28, 1965   L. N. SCHWIEN   3,225,599
MANOMETER
Filed Jan. 18, 1963   3 Sheets-Sheet 1

Fig. 1.

INVENTOR.
LEO NEVIN SCHWIEN
BY HIS ATTORNEYS
HARRIS, KIECH, RUSSELL & KERN

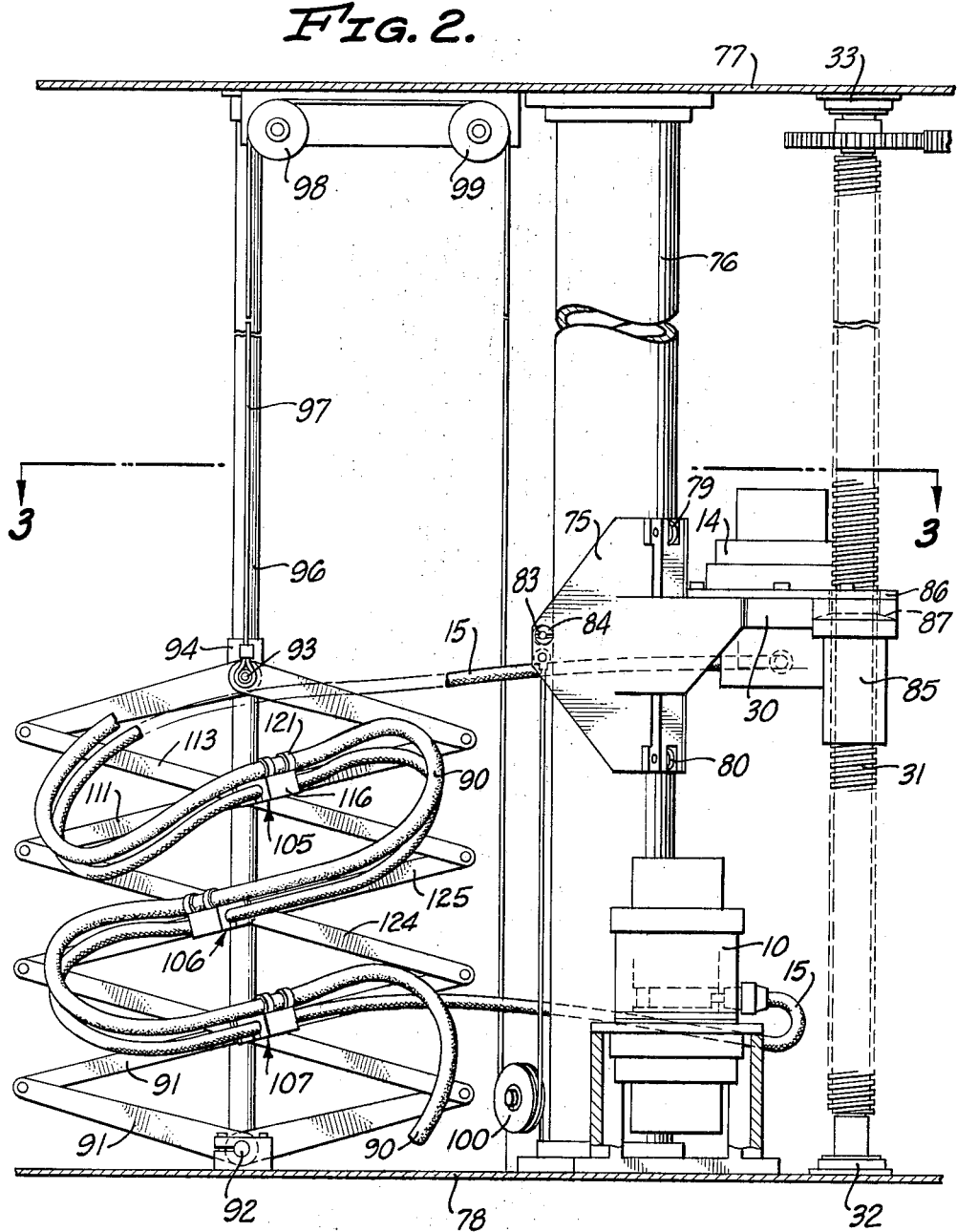

Dec. 28, 1965          L. N. SCHWIEN          3,225,599
MANOMETER
Filed Jan. 18, 1963                    3 Sheets-Sheet 3
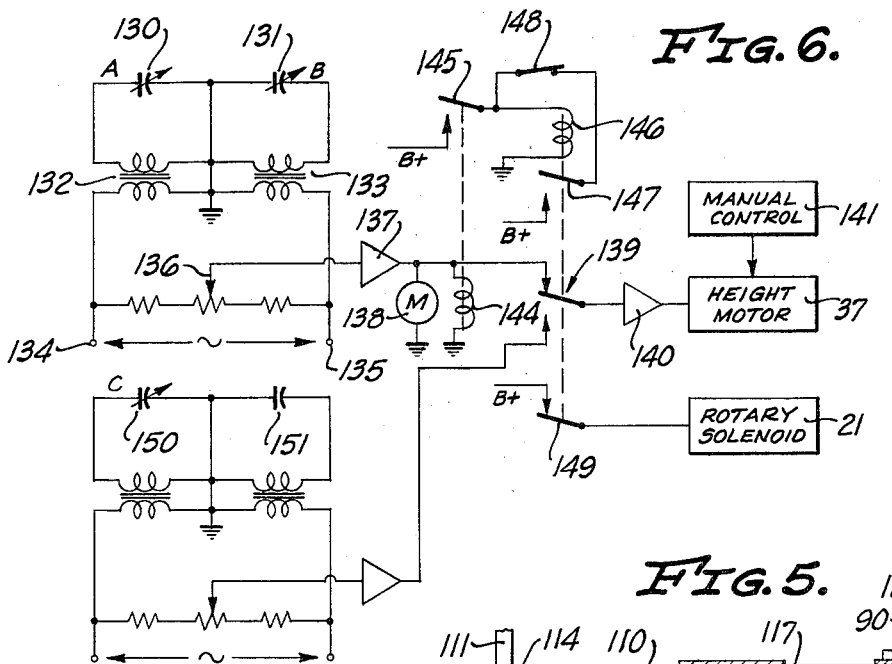
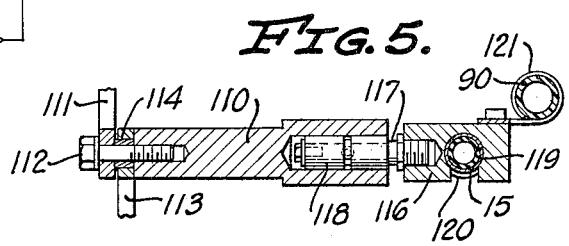
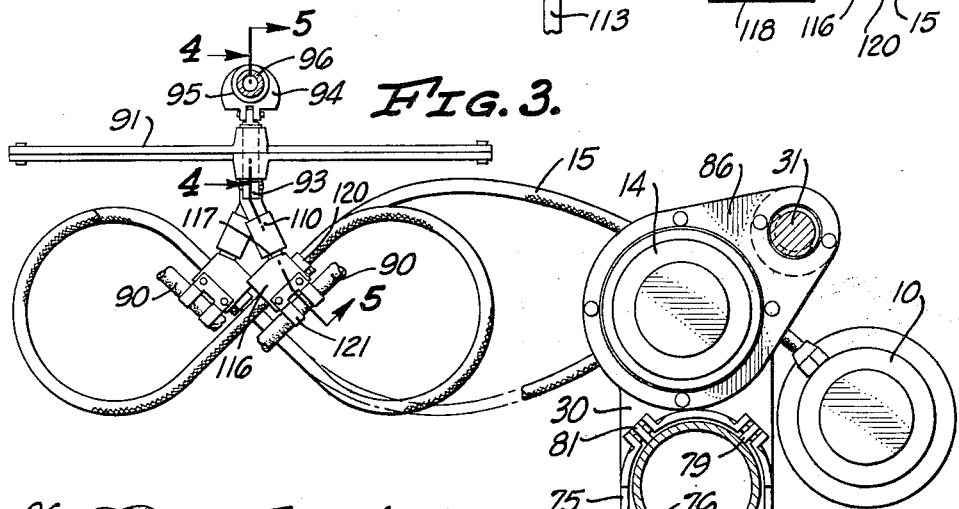
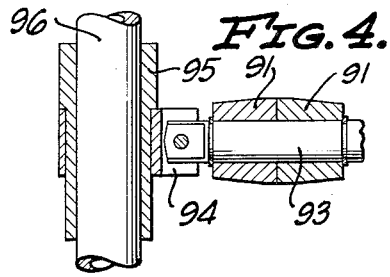
INVENTOR.
LEO NEVIN SCHWIEN
BY HIS ATTORNEYS
HARRIS, KIECH, RUSSELL & KERN

United States Patent Office 3,225,599
Patented Dec. 28, 1965

3,225,599
MANOMETER
Leo Nevin Schwien, Los Angeles, Calif., assignor to Schwien Engineering, Inc., Los Angeles, Calif., a corporation of California
Filed Jan. 18, 1963, Ser. No. 252,498
14 Claims. (Cl. 73—401)

This invention relates to manometers and, in particular, to a precision mercury manometer system and to improvements therein.

The instrument of the invention includes a U-tube mercury manometer in which each end of the tube is a large diameter cistern while the remainder of the tube is of relatively small bore. The U-tube is filled with mercury to provide a pool of mercury in each cistern and a capacitor plate is positioned in each cistern above the pool. The mercury to plate gaps operate as variable capacitors in a bridge energized from an oscillator with the bridge providing an output varying in magnitude representative of the difference of the mercury to plate gaps. One of the cisterns is movable with respect to the other. The bridge output may be displayed on a meter permitting manual balancing of the system by moving one of the cisterns in elevation. Alternatively the bridge output may be used to drive a servo for automatically moving a cistern to balance the system. The difference in elevation of the two cisterns provides a direct measure of the difference in pressure at the two cisterns with the moving cistern normally connected to a very low pressure and the fixed cistern connected to the unknown pressure.

It is an object of the invention to provide such a manometer having a very high accuracy with a maximum error in the order of 0.0005 inch. A further object is to provide such an instrument incorporating direct digital readout of elevation to eliminate scale reading errors. An additional object is to provide such an instrument incorporating capacitance measuring of mercury levels with the measurements being made at the central areas of the mercury pools thereby eliminating meniscus variation effects. Another object is to provide such an instrument incorporating continuous temperature compensation both for the mercury and for the physical structure.

It is a particular object of the invention to provide a manometer system including interconnected fixed and moving cisterns carrying pools of mercury and capacitor plates thereabove, a lower pressure source connected to the upper cistern above the pool, a higher pressure source or line connected to the lower cistern above the pool, a bridge circuit incorporating the cistern capacitors for indicating system unbalance, and means for driving the moving cistern in elevation to balance the system.

It is an object of the invention to provide a manometer system including means for blocking the interconnection between the two pools when a large unbalance exists and means for rapidly driving the moving cistern to rebalance the system while the interconnection is closed.

It is a particular object to provide such a system including a fixed divider plate in the lower cistern providing upper and intermediate chambers with a passage therebetween, a flexible divider plate in the lower cistern separating the intermediate chamber from a lower chamber, with the cistern interconnecting line connected to the intermediate chamber to fill the intermediate chamber and provide a pool of mercury in the upper chamber, and with the higher pressure source connected to the upper chamber above the pool and to the lower chamber, means for closing and opening the passage between the upper and intermediate chambers, and means for measuring the position of the flexible divider plate relative to the cistern to provide a signal varying as a function of the unbalance of the system. A further object is to provide such a system including means for measuring the position of the flexible divider plate to provide an error signal and means for coupling the error signal to the cistern driving means to move the cistern in elevation to reduce the error signal to a minimum. An additional object is to provide such a system including means for automatically closing the passage within the fixed cistern when the system unbalance exceeds a predetermined value and means for automatically driving the moving cistern to restore the system balance.

It is an object of the invention to provide a manometer system which can be used for measuring an unknown pressure at the lower cistern or for maintaining a predetermined pressure at the input line to the lower cistern.

It is an object to provide a manometer system including a pressure regulator having a pair of inputs and an output and control means for varying the setting of the regulator, means for coupling the regulator output to the pressure line of the lower cistern, means for coupling a pressure source of a magnitude greater than the desired line pressure to one of the regulator inputs and a pressure source of a magnitude less than the desired line pressure to the other of the regulator inputs, and motor means connected to the regulator control means in driving relation and having the error signal from the cistern capacitor bridge as an input for varying the regulator setting and the line pressure to maintain the system balance.

It is an object of the invention to provide a new and improved structure in a manometer system for supporting the moving cistern to maintain its planar position without side loading of the lead screw and thereby eliminate bending effects of the lead screw. A further object is to provide such a structure including means for supporting the mercury carrying cistern interconnecting line at the level of the moving cistern while permitting the line to be freely expanded and contracted over a vertical height of one hundred inches or greater.

It is an object to provide such a manometer system including a vertical column, a lead screw positioned parallel to the column, a nut driven by the lead screw, a cistern carrier for carrying the moving cistern and including a collar positioned about the column, a plurality of column engaging means carried in the collar and spaced around the column and spaced vertically along the column and in engagement with the column for maintaining the cistern carrier parallel to a reference plane at any elevation, and means for coupling the nut to the carrier for driving the carrier by rotation of the lead screw. A further object is to provide such a structure in which the carrier rests on the lead screw nut with the nut pushing the carrier upward and with the force of gravity moving the carrier downward as the nut is lowered.

It is an object of the invention to provide a manometer system including a pantograph disposed for vertical expansion and contraction and including a plurality of arms pivotally joined at the ends and at crossing points, means for expanding the pantograph in synchronism with the moving cistern, a first mercury line support carried at an arm crossing point and including means for positioning the mercury carrying line along a path approximately forty-five degrees to the vertical plane of the pantograph, and a second mercury line support carried at an adjacent arm crossing point and including means for positioning the line along a path approximately forty-five degrees to the vertical plane of the pantograph and ninety degrees to the path in the first line support to form the line in a figure-eight pattern. A further object is to provide such a structure including a cable connected to the upper end of the pantograph, passing over a pulley above the pantograph and another pulley below the moving cistern and coupled to the moving cistern. An additional object is to provide such a structure in which the mercury line supports include a first block fixed to one of the arms and a second block mounted on the first block for pivoting about an axis oblique to and lying in a plane with the longitudinal axis of the arm carrying the block.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a diagrammatic illustration of a preferred form of the invention;

FIG. 2 is a view in elevation of the moving cistern and line support structure;

FIG. 3 is a sectional view taken along the line 3—3 of FIG. 2;

FIG. 4 is an enlarged sectional view taken along the line 4—4 of FIG. 3;

FIG. 5 is an enlarged sectional view taken along the line 5—5 of FIG. 3; and

FIG. 6 is an electrical schematic of a portion of the instrument of FIG. 1.

Referring to FIG. 1, the manometer system includes a fixed cistern 10 having an upper chamber 11, an intermediate chamber 12 and a lower chamber 13. The intermediate chamber 12 is connected to a moving cistern 14 by an interconnecting line 15. A passage 16 interconnects the upper and intermediate chambers of the fixed cistern with the intermediate chamber and the line 15 being filled with mercury to provide pools in the upper chamber 11 and in the moving cistern 14.

A low pressure source such as a vacuum pump 17 is connected to the moving cistern 14 above the mercury pool. Ideally the low pressure should be a perfect vacuum and in the embodiments presently being operated, the pressure is typically less than five microns. A reference pressure, typically atmospheric pressure, is connected to the upper chamber 11 of the fixed cistern above the mercury pool and to the lower chamber 13 via a line 18. Means are provided for blocking mercury flow between the cisterns and typically may be positioned in the fixed cistern for closing the passage 16. Such structure may incorporate a valve carried on a shaft 19 that is raised and lowered by a cam 20 driven by a rotary solenoid 21.

A capacitor plate 24 is supported on an insulator within the moving cistern 14 above the mercury pool. A similar capacitor plate 25 is supported within the upper chamber of the fixed cistern above the mercury pool. Typically, a relatively flexible diaphragm 27 may function as the divider between the intermediate and lower chambers. Means are provided for sensing the position of the diaphragm 27 and may comprise another capacitor plate 26 supported on an insulator within the lower chamber 13.

The moving cistern 14 is supported on a carrier 30 driven by a lead screw 31 journalled in bearings 32, 33. The lead screw is driven through a shaft 34, a differential 35 and another shaft 36 by a motor 37 or a manually operated knob 38. A digital counter 39 is also driven by the shaft 36 to provide a direct reading in inches of the elevation of the moving cistern 14 above the fixed cistern 10.

A second input to the differential 35 may be provided through a shaft 42, a shaft 43 and a motor 44. The motor 44 provides a correction of the elevation of the moving cistern for variation in temperature and gravity from the standard. The motor 44 is driven from a servo amplifier 45 having as inputs a signal from a temperature sensor 46 in the moving cistern and a temperature sensor 47 in the fixed cistern, a signal from a height potentiometer 48, and a signal from a follow-up potentiometer 49. An adjustment for variation in gravity at the location of the instrument may be incorporated in the amplifier 45, as by a variable resistor or potentiometer. Another digital counter 50 is driven by the shaft 43 to provide an indication of the amount of correction.

A valve 55 provides for coupling the line 18 to the atmosphere through line 56 or to a line 57 to permit measurement of the pressure on the line 57 or to provide a constant pressure on the line. When it is desired to use the manometer as a pressure standard to provide a known pressure on the line 57, additional apparatus is coupled to the line 57 by a valve 58. An adjustable regulator 60 has a vacuum source connected to one input through a line 61 and a pressure source connected to another input through a line 62 and a demand regulator 63. The output of the regulator 60 is connected to the valve 58 and to the control side of the demand regulator through another line 64. Typically the regulator 60 may be a Moore Nullmatic model 43 and the regulator 63 may be a Moore model 63DB.

The adjustment shaft 65 of the regulator 60 is driven by a motor 66 through a differential 67. A magnetic brake 68 energized via a switch 69 permits selecting one of two available ratio settings for the differential. The motor 66 is driven from an amplifier 70 having as inputs an error signal from a bridge to be described hereinbelow and a follow-up signal from a tachometer 71 driven by the motor 66.

FIGS. 2–5 illustrate in detail the mechanism for raising and lowering the moving cistern while maintaining the desired accuracy and stability. The moving cistern 14 is supported in a carrier 30 which includes a collar 75 positioned around a column 76. The column 76 and the lead screw 31 are disposed parallel to each other between the top and bottom plates 77, 78 of the instrument housing. A pair of vertically spaced wheels 79, 80 is carried in the collar 75 for rotation about horizontal axes. A similar pair of vertically spaced wheels, the upper shown at 81 in FIG. 3, is carried in the collar 75 for rotation about horizontal axes, with the second pair spaced around the column 76 from the first pair. Another wheel 82 is carried on a shaft 83 forming a part of the collar 75. The shaft 83 is mounted in an eccentric bushing 84 for adjusting the position of the axis of rotation of the wheel 82.

The column 76 is ground and polished to have a uniform diameter along its entire length. The collar 75 is dimensioned and the eccentric bushing 84 is finally adjusted to bring the five wheels into engagement with the column to permit the cistern carrier to be moved along the column while maintaining the cistern parallel to a reference plane at any position along the column. In a typical instrument, the cistern may contain a three-inch diameter pool of mercury and be movable over a range of one hundred inches thereby placing considerable side loading on any supporting structure such as the conventional lead screw. In the embodiment disclosed herein, the column 76 is a four-inch diameter tube which when operated in conjunction with the cistern carrier illustrated will support the cistern at any operating position without deflection from the vertical position. In an alternative structure, slide surfaces can be substituted for the wheels to engage ways on the column, utilizing the same arrangement of supporting engagement.

A threaded nut 85 is carried on the lead screw 31 and moves up and down as the lead screw is rotated. A stud on the nut may engage a slot in the carrier to prevent rotation of the nut. An arm 86 of the carrier 30 extends over the nut 85 and rests thereon, the arm preferably having a concave spherical lower surface engaging a mating spherical upper surface 87 of the nut 85. Upward motion of the nut 85 drives the cistern carrier up the column 76 while downward motion of the nut 85 permits the carrier to move downward. The mating spherical surfaces provide for self alignment of the nut and carrier to substantially eliminate side loading on the nut and lead screw and for minimum frictional engagement during any possible bending of the lead screw.

The mercury carrying line 15 is supported by a pantograph structure which is raised and lowered in synchronism with the moving cistern. The cistern may move over a vertical range of one hundred inches or more requiring storage facilities for a considerable length of line which must be handled without undue loading on the cistern driving mechanism and without creating impedance to the flow of mercury between the cisterns. The pantograph of the invention provides for storing a long length of mercury line in a figure-eight pattern permitting raising and lowering of the upper end of the line with ease. The structure also provides support for an additional line 90 which connects the vacuum pump 17 to the moving cistern. Electrical connections to the moving cistern may be carried along with the vacuum line 90.

The pantograph includes a plurality of arms 91 pivotally interconnected at their ends and at their crossing points. The two bottom arms are pivoted on a pin 92 carried from the base plate 78. The two top arms are pivoted on a pin 93 mounted on a collar 94 and bushing 95 which in turn slides vertically on a guide rod 96. A cable 97 (FIG. 2) is clamped around the pin 93 at the upper end of the pantograph, passes over upper pulleys 98, 99 and lower pulley 100, and terminates at the collar 75 of the moving cistern carrier 30. The cable provides vertical motion of the upper end of the pantograph along the column 96 in synchronism with the vertical motion of the carrier along the column 76.

A line support unit is carried at each crossing point of the pantograph, here shown as line support units 105, 106, 107, the line support unit at the upper pin 93 being omitted from the drawing for purposes of clarity.

The line support unit 105 is shown in greater detail in FIGS. 3 and 5. A block 110 is clamped to the arm 111 by a bolt 112, with the arm 113 pivoting on a bushing 114. Another block 116 is carried on a swivel 117 which rotates in a bushing 118 carried in the block 110. The mercury line 15 is positioned in a passage 119 through the block 116 with a clamp nut 120 on the line preventing downward movement of the line through the block. The vacuum line 90 is carried in a cable clamp 121 mounted on the block 116. The axis of rotation of the swivel 117 is oblique to the vertical plane of the pantograph arms, as best seen in FIG. 3. As stated previously, the block 110 is preferably fixed to the arm 111 and is oriented so that the axis of rotation of the swivel and the longitudinal axis of the arm 111 lie in a plane. The passage 119 through the block 116 is oriented at approximately forty-five degrees to the vertical plane of the pantograph arms as seen in FIG. 3. The next support unit 106 is a mirror image of the unit 105 with the groove for the mercury line at approximately forty-five degrees to the vertical plane of the pantograph arms and at approximately ninety degrees to the groove in the unit above to produce the figure-eight loop in the line, as best seen in FIG. 3. The first block of the unit 106 is preferably fixed to the arm 124, with the arm 125 pivoting on a bushing. The support unit 107 is identical to the unit 105. The particular number of arms and support units in the pantograph will be selected depending upon the total travel of the moving cistern.

The bridge circuits of the instrument are shown in FIG. 6. The cisterns and the mercury column are connected to circuit ground with the pool of mercury in a cistern functioning as one plate of the capacitor therein. The pool of mercury and the plate 24 in the moving cistern 14 provide a capacitor 130 and the pool of mercury and the plate 25 in the cistern 10 provide another capacitor 131. These capacitors are coupled into a bridge circuit by impedance changing transformers 132, 133, respectively, with the bridge circuit being energized across terminals 134, 135. Typically the bridge input is one and one-half volts A.C. at one hundred kilocycles. The bridge output or error signal appears at the arm 136 of the balance potentiometer and is coupled through an amplifier and demodulator 137 to an indicating meter 138. The error signal may also be coupled to the height motor 37 through a contact set 139 and motor amplifier 140 to continuously drive the lead screw to maintain the system in balance. Alternatively, the operator may read the indicated error on the meter 138 and drive the motor via manual pushbuttons or switches 141.

When the error signal exceeds a predetermined amount, the solenoid 144 of a sensitive relay is energized to close contact set 145 and actuate relay 146. Actuation of the relay 146 closes contact set 147 to maintain the relay energized through switch 148, opens contact set 149 to de-energize the rotary solenoid 21 and close the passage between the upper and intermediate chambers of the fixed cistern, and actuates the contact set 139 to energize the height motor 37 from a second bridge circuit.

The second bridge circuit may be identical to the first bridge circuit with a capacitor 150 comprising the plate 26 and the diaphragm 27 which contacts the mercury column of the fixed cistern, and a reference capacitor 151. In an alternative arrangement, only a single bridge circuit need be used with the capacitors 150, 151 being substituted for the capacitors 130, 131 by the relay 146.

In a typical instrument, each cistern has an inside diameter of three inches and the capacitor plate therein a diameter of two inches. The mercury line is filled until the gap between the plate and the free surface of mercury in each cistern is approximately 0.020 inch. The two mercury to plate gaps operate as variable capacitors in the bridge energized from the hundred kilocycle oscillator with the difference in magnitude of the mercury to plate gaps representing the error signal or voltage output from the bridge which is displayed on the meter. The accuracy of gauging is dependent upon the accuracy of equating the gaps while the absolute value of the gaps can vary appreciably without loss of accuracy. The capacitor plates are spaced from the sides of the cisterns thereby eliminating capacitance variations resulting from various meniscus shapes in the pools. The moving cistern is elevated either by manual driving via the knob 38 or by manual energization of the motor 37 or by automatic energization of the motor from the bridge circuit to alter the head of mercury and balance the pneumatic pressure at the fixed cistern. This pressure in terms of inches of mercury is read directly at the counter 39. The maximum error in the instrument described herein is 0.0005 inch plus 0.005% of the reading.

When the system unbalance exceeds more than about thirty thousandths of an inch, the error signal is sufficient to energize the solenoid 144 and actuate the switching relay 146. This de-energizes the rotary solenoid to close the valve in the fixed cistern and block the flow of mercury between the cisterns, preventing emptying or overfilling of a cistern. Actuation of the relay 146 also brings the auxiliary balancing system into operation which automatically brings the system to the approximate null. The head of mercury provided by the moving cistern is applied to the upper side of the diaphragm 27 while the pressure being measured appears at the lower side of this diaphragm. Hence diaphragm deflection is a measure of the head and provides an error signal via the second bridge for driving the height motor to approximately balance the system. In a typical operating sequence, the solenoid 144 and relay 146 will be automatically operated when the error exceeds the predetermined value to place the lead screw drive under the control of the second bridge circuit. Then the system will automatically drive to the approximate null and stop. When this operation is complete, the switch 148 is opened, either manually or automatically, to restore the system to the control of the first bridge utilizing the two capacitors in the fixed and moving cisterns.

The instrument may be operated as described above to measure atmospheric pressure or to measure an unknown pressure connected to the line 57. In an alternative mode of operation, the instrument may be used to maintain a particular pressure on the line 57. For this operation, the valve 55 is rotated to connect the line 18 to the line 57 and the valve 58 is roated to connect the line 57 to the line 64. The error signal from the first bridge amplifier 137 is connected as an input to the amplifier 70 (FIG. 1) rather than to the height motor 37. The error signal may continue to be connected to the meter 138 to provide an indication of the accuracy of operation. The moving cistern is moved until the desired pressure is indicated at the counter 39. If the pressure on the line 57, and hence the pressure at the fixed cistern, does not produce system balance, the unbalance signal actuates the motor 66 to change the setting of the regulator 60 to provide the desired pressure at the line 57 and bring the system into balance. The instrument may also be used to measure a pressure differential, with the lower pressure connected to the upper cistern and the higher pressure connected to the lower cistern.

In the embodiment illustrated herein, the upper cistern is the moving cistern. However, the invention is equally applicable in arrangements wherein the lower cistern is the moving unit.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a fixed divider plate in the lower cistern providing upper and intermediate chambers and including a passage interconnecting said upper and intermediate chambers;
   a flexible divider plate in the lower cistern separating the intermediate chamber from a lower chamber, with the cistern interconnecting line connected to said intermediate chamber to fill the intermediate chamber and provide a pool of mercury in the upper chamber, and with the higher pressure source connected to said upper chamber above the pool and to said lower chamber;
   means for closing and opening said passage; and
   means for measuring the position of said flexible divider plate relative to the cistern to provide a signal varying as a function of the unbalance of the system.

2. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a fixed divider plate in the lower cistern providing upper and intermediate chambers and including a passage interconnecting said upper and intermediate chambers;
   a flexible divider plate in the lower cistern separating the intermediate chamber from a lower chamber, with the cistern interconnecting line connected to said intermediate chamber to fill the intermediate chamber and provide a pool of mercury in the upper chamber, and with the higher pressure source connected to said upper chamber above the pool and to said lower chamber;
   means for closing and opening said passage;
   means for measuring the position of said flexible divider plate relative to the cistern to provide an error signal varying as a function of the unbalance of the system; and
   means for coupling said error signal to said means for driving the moving cistern in actuating relation to move the cistern in elevation to reduce said error signal to a minimum.

3. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and a motor for driving the moving cistern in elevation to balance the system, the improvement comprising:

a fixed divider plate in the lower cistern providing upper and intermediate chambers and including a passage connecting said upper and intermediate chambers;
   a flexible divider plate in the lower cistern separating the intermediate chamber from a lower chamber, with the cistern interconnecting line connected to said intermediate chamber to fill the intermediate chamber and provide a pool of mercury in the upper chamber, and with the higher pressure source connected to said upper chamber above the pool and to said lower chamber;
   means for closing said passage when the system unbalance exceeds a predetermined value;
   means for measuring the position of said flexible divider plate relative to the cistern to provide an error signal varying as a function of the unbalance of the system; and
   means for coupling said error signal to said motor in driving relation to move the cistern in elevation and reduce said error signal to a minimum.

4. In a manometer system including interconnected upper and lower cisterns, one of which is moving and the other being fixed, said cisterns carrying pools of mercury and capacitor plates thereabove, a lower pressure source connected to the upper cistern above the pool, a higher pressure source connected to the lower cistern above the pool, a first bridge circuit incorporating the cistern capacitors for indicating system unbalance, and means for driving the moving cistern in elevation to balance the system, the improvement comprising:

a fixed divider plate in the lower cistern providing upper and intermediate chambers and including a passage connecting said upper and intermediate chambers;
   a flexible divider plate in the lower cistern separating the intermediate chamber from a lower chamber and including a capacitor plate, with the cistern interconnecting line connected to said intermediate chamber to fill the intermediate chamber and provide a pool of mercury in the upper chamber, and with the higher pressure source connected to said upper chamber above the pool and to said lower chamber;
   means for closing said passage when the system unbalance indicated by the first bridge circuit exceeds a predetermined value;
   a second bridge circuit incorporating said flexible divider capacitor plate for measuring the position of said flexible divider plate relative to the cistern to provide an error signal varying as a function of the unbalance of the system; and
   means for coupling said error signal to said means for driving the moving cistern in actuating relation to move the cistern in elevation and reduce said error signal to a minimum.

5. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

valve means for blocking flow of mercury between the cisterns;

means defining a chamber and including a flexible divider plate dividing said chamber into two zones;

means for coupling pressure from one side of said valve means to one of said zones;

means for coupling pressure from the other side of said valve means to the other of said zones; and means for measuring the position of said flexible divider plate relative to the chamber to provide a signal varying as a function of the unbalance of the system.

6. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a vertical column;

a lead screw positioned parallel to said column;

a nut driven by said lead screw;

a cistern carrier for carrying said moving cistern and including a collar positioned about said column;

a plurality of column engaging means carried in said collar and spaced around said column and spaced vertically along said column and in engagement with said column for maintaining said cistern carrier parallel to a reference plane at any elevation; and means for coupling said nut to said carrier for driving said carrier by rotation of said lead screw.

7. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a vertical column;

a lead screw positioned parallel to said column;

a nut driven by said lead screw;

a cistern carrier for carrying said moving cistern and including a collar positioned about said column and an arm resting on said nut; and a plurality of column engaging means carried in said collar and spaced around said column and spaced vertically along said column and in engagement with said column for maintaining said cistern carrier parallel to a reference plane at any elevation;

with said nut pushing said carrier upward along said column as said nut is raised by rotation of said lead screw and with the force of gravity maintaining said carrier in engagement with said nut as said nut is lowered.

8. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a vertical column;

a lead screw positioned parallel to said column;

a nut driven by said lead screw and having a spherical upper end;

a cistern carrier for carrying said moving cistern and including a collar positioned about said column and an arm having a spherical concave surface resting on said end of said nut; and a plurality of wheels carried in said collar for rotation about horizontal axes, with a first pair of wheels in a first vertical line, a second pair of wheels in a second vertical line, and another wheel, with said first and second pairs and said other wheel spaced around said column, and with the upper wheels of said pairs at the same elevation and the lower wheels of said pairs at the same elevation and said other wheel at an intermediate elevation;

with said nut pushing said carrier upward along said column as said nut is raised by rotation of said lead screw and with the force of gravity maintaining said carrier in engagement with said nut as said nut is lowered, 9. An apparatus as defined in claim 8 in which said collar includes a horizontally disposed shaft carrying said other wheel, and means for mounting said shaft in said collar for rotation about an axis eccentric with the axis of said other wheel.

10. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a flexible mercury carrying line interconnecting said cisterns;

a pantograph disposed for vertical expansion and contraction and including a plurality of arms pivotally joined at the ends and at crossing points;

means for expanding said pantograph;

a first mercury line support carried at an arm crossing point and including a block mounted for pivoting about an axis oblique to the longitudinal axis of an arm, and means for positioning said line at the block along a path approximately forty-five degrees to the plane of said pantograph; and a second mercury line support carried at an adjacent arm crossing point and including a block mounted for pivoting about an axis oblique to the longitudinal axis of an arm, and means for positioning said line at the block along a path approximately forty-five degrees to the plane of said pantograph and ninety degrees to the path in the first line support to form said line in a figure-eight pattern.

11. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a flexible mercury carrying line interconnecting said cisterns;

a pantograph disposed for vertical expansion and contraction and including a plurality of arms pivotally joined at the ends and at crossing points;

means for expanding said pantograph;

a first mercury line support carried at an arm crossing point and including a first block fixed to one of the arms, a second block mounted on said first block for pivoting about an axis oblique to and lying in a plane with the longitudinal axis of said one arm, and means for positioning said line at said second block along a path approximately forty-five degrees to the plane of said pantograph; and a second mercury line support carried at the next arm crossing point and including a third block fixed to one of the arms at the crossing point, a fourth block mounted on said third block for pivoting about an axis oblique to and lying in a plane with the longitudinal axis of said one arm, and means for positioning said line at said fourth block along a path approximately forty-five degrees to the plane of said pantograph and ninety degrees to the path in the first line support to form said line in a figure-eight pattern.

12. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a flexible mercury carrying line interconnecting said cisterns;
a pantograph disposed for vertical expansion and contraction and including a plurality of arms pivotally joined at the ends and at crossing points;
a cable connected between the upper end of said pantograph and said moving cistern and passing over a first pulley below said moving cistern for moving said pantograph end and said cistern in synchronism;
a first mercury line support carried at an arm crossing point and including a first block fixed to one of the arms, a second block mounted on said first block for pivoting about an axis oblique to and lying in a plane with the longitudinal axis of said one arm, and means for positioning said line at said second block along a path approximately forty-five degrees to the plane of said pantograph; and
a second mercury line support carried at the next arm crossing point and including a third block fixed to one of the arms at the crossing point, a fourth block mounted on said third block for pivoting about an axis oblique to and lying in a plane with the longitudinal axis of said one arm, and means for positioning said line at said fourth block along a path approximately forty-five degrees to the plane of said pantograph and ninety degrees to the path in the first line support to form said line in a figure-eight pattern.

13. In a manometer system including interconnected upper and lower cisterns, one of which is moving and the other being fixed, said cisterns carrying pools of mercury, a lower pressure source connected to the upper cistern above the pool, a higher pressure source connected to the lower cistern above the pool, and means for driving the moving cistern in elevation to balance the system, the improvement comprising:

a flexible mercury carrying line interconnecting said cisterns;
a pantograph disposed for vertical expansion and contraction and including a plurality of arms pivotally joined at the ends and at crossing points;
a vertical guide column;
a collar slidably mounted on said column and including means for pivotally carrying the upper end of said pantograph;
a cable connected to said pantograph at said upper end for expanding said pantograph and raising said line;
a first mercury line support carried at an arm crossing point and including a first block fixed to one of the arms, a second block mounted on said first block for pivoting about an axis oblique to and lying in a plane with the longitudinal axis of said one arm, and means for positioning said line at said second block along a path approximately forty-five degrees to the plane of said pantograph; and
a second mercury line support carried at the next arm crossing point and including a third block fixed to one of the arms at the crossing point, a fourth block mounted on said third block for pivoting about an axis oblique to and lying in a plane with the longitudinal axis of said one arm, and means for positioning said line at said fourth block along a path approximately forty-five degrees to the plane of said pantograph and ninety degrees to the path in the first line support to form said line in a figure-eight pattern.

14. In a manometer system including interconnected upper and lower cisterns, one of which is moving and the other being fixed, said cisterns carrying pools of mercury, a lower source connected to the upper cistern above the pool, a higher pressure source connected to the lower cistern above the pool, and means for driving the moving cistern in elevation to balance the system, the improvement comprising:

a vertical column;
a lead screw positioned parallel to said column;
a nut driven by said lead screw;
a cistern carrier for carrying said moving cistern and including a collar positioned about said column and an arm resting on said nut;
a plurality of column engaging means carried in said collar and spaced around said column and spaced vertically along said column and in engagement with said column for maintaining said cistern carrier parallel to a reference plane at any elevation;
a flexible mercury carrying line interconnecting said cisterns;
a pantograph disposed for vertical expansion and contraction and including a plurality of arms pivotally joined at the ends and at crossing points;
a cable connected between the upper end of said pantograph and said cistern carrier and passing over a first pulley above said pantograph and a second pulley below said moving cistern for moving said pantograph end and said cistern in synchronism;
a first mercury line support carried at an arm crossing point and including a first block fixed to one of the arms, a second block mounted on said first block for pivoting about an axis oblique to and lying in a plane with the longitudinal axis of said one arm, and means for positioning said line at said second block along a path approximately forty-five degrees to the plane of said pantograph; and
a second mercury line support carried at the next arm crossing point and including a third block fixed to one of the arms at the crossing point, a fourth block mounted on said third block for pivoting about an axis oblique to and lying in a plane with the longitudinal axis of said one arm, and means for positioning said line at said fourth block along a path approximately forty-five degrees to the plane of said pantograph and ninety degrees to the path in the first line support to form said line in a figure-eight pattern;
with said nut pushing said carrier upward along said column raising said moving cistern and pantograph as said nut is raised by rotation of said lead screw and with the tension force of said cable maintaining said carrier in engagement with said nut as said nut is lowered.

References Cited by the Examiner

UNITED STATES PATENTS

| | | | |
|---|---|---|---|
| 2,389,508 | 11/1945 | Hejduk | 73—401 |
| 2,412,725 | 12/1946 | Fitch | 137—102 |
| 2,994,334 | 8/1961 | Loveless | 137—102 |
| 3,108,476 | 10/1963 | Koelle | 73—401 |

LOUIS R. PRINCE, *Primary Examiner.*

ROBERT L. EVANS, *Examiner.*